(12) United States Patent
Hickman et al.

(10) Patent No.: US 12,081,523 B1
(45) Date of Patent: Sep. 3, 2024

(54) SYSTEMS AND METHODS FOR MANAGING FIREWALL RULES AND CONNECTIONS BETWEEN DIFFERENT SERVICES

(71) Applicant: Palantir Technologies Inc., Denver, CO (US)

(72) Inventors: William Hickman, Park City, UT (US); Charissa Plattner, New York City, NY (US); Kevin Simons, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 275 days.

(21) Appl. No.: 17/592,890

(22) Filed: Feb. 4, 2022

Related U.S. Application Data (60) Provisional application No. 63/147,020, filed on Feb. 8, 2021.

(51) Int. Cl.
   *H04L 9/40* (2022.01)
(52) U.S. Cl.
   CPC .......... *H04L 63/0263* (2013.01); *H04L 63/20* (2013.01)
(58) Field of Classification Search
   CPC ............................ H04L 63/0263; H04L 63/20
   USPC .......................................................... 726/11
   See application file for complete search history.

(56) References Cited

U.S. PATENT DOCUMENTS

| | | | | |
|---|---|---|---|---|
| 10,824,420 B2* | 11/2020 | Collins | ..................... | G06F 8/10 |
| 11,265,292 B1* | 3/2022 | Leviseur | ............ | H04L 63/0263 |
| 11,627,154 B2* | 4/2023 | Shua | ................ | H04L 63/1441 |
| | | | | 718/1 |
| 11,647,034 B2* | 5/2023 | Levin | .................... | H04L 63/107 |
| | | | | 726/23 |
| 2002/0126621 A1* | 9/2002 | Johnson | ................... | G06F 8/24 |
| | | | | 370/428 |
| 2016/0057159 A1* | 2/2016 | Yin | ....................... | H04L 63/145 |
| | | | | 726/23 |
| 2019/0108342 A1* | 4/2019 | Conikee | ................ | G06F 21/554 |
| 2020/0351176 A1* | 11/2020 | Venkiteswaran | ....... | G06F 9/451 |

* cited by examiner

*Primary Examiner* — Teshome Hailu
(74) *Attorney, Agent, or Firm* — Faegre Drinker Biddle & Reath LLP (57) ABSTRACT

A system for managing firewall rules between different services. In certain instances, the method includes receiving a discovery graph comprising a plurality of services and at least one application programming interface (API) dependency, wherein the plurality of services comprises a first service and a second service. In some instances, the method further includes determining whether the second service is permitted to receive an initial communication from the first service based upon the at least one API dependency included in the discovery graph. And, in response to determining the second service is permitted to receive the initial communication from the first service, the method can include establishing a first rule for a firewall between the first service and the second service, the first rule allowing the second service to receive the initial communication from the first service.

14 Claims, 5 Drawing Sheets

SYSTEMS AND METHODS FOR MANAGING FIREWALL RULES AND CONNECTIONS BETWEEN DIFFERENT SERVICES

CROSS REFERENCE TO RELATED APPLICATIONS

This application claims priority to U.S. Provisional Application No. 63/147,020, filed Feb. 8, 2021, incorporated by reference herein for all purposes.

BACKGROUND

Certain embodiments of the present invention are directed to managing firewall rules. More particularly, some embodiments of the present invention provide systems and methods for managing firewall rules and connections between different services.

A company's services oftentimes work in a virtual private cloud environment (VPC). In many instances, the services in a VPC need to communicate with one another, as determined by one or more API dependencies. To reduce the likelihood of unauthorized access to one or more of the company's services, firewalls are created. In conventional embodiments, the firewalls are manually maintained. Due to their manual maintenance, the firewalls can easily go out of date if the details of an API change, or if a service introduces a new API dependency.

In some instances, the services are located on different VPCs. In these embodiments, two services oftentimes communicate with one another via the open internet. However, the open internet is an access point for an unauthorized user to access the VPCs and/or the services located therein. Further, more configuration is required and it is less efficient when a first service of a first VPC communicates with a second service of a second VPC when the communication needs to be relayed: (i) from the first service to the open internet via a port of the first VPC to the open internet, (ii) then via the open internet to a second port of the second VPC, (iii) and finally from the second port to the second service in the second VPC.

Hence it is highly desirable to improve techniques for managing firewall rules and connections between different services.

SUMMARY

In certain implementations, a system and a method for managing firewall rules between different services receives a discovery graph including a plurality of services and at least one application programming interface (API) dependency, wherein the plurality of services includes a first service and a second service. In some examples, the system and the method determine whether the second service is permitted to receive an initial communication from the first service based upon at least one API dependency included in the discovery graph. And, in response to determining the second service is permitted to receive the initial communication from the first service, the system and the method establish a first rule for a firewall between the first service and the second service, the first rule allowing the second service to receive the initial communication from the first service.

In some implementations, a system and a method for managing communication between services located in distinct virtual private cloud (VPC) environments receives a discovery graph comprising a plurality of services and at least one API dependency, wherein a first service of the plurality of services is running on a first VPC environment and a second service of the plurality of services is running on a second VPC environment, and wherein the first VPC environment and the second VPC environment are distinct VPC environments. In some examples, the system and the method determine whether the second service is permitted to receive an initial communication from the first service based upon the at least one API dependency included in the discovery graph. And, in some instances, in response to determining the second service is permitted to receive the initial communication from the first service, the system and the method establish a virtual private connection between the first service and the second service and establish a first rule for a firewall between the first service and the second service, the first rule allowing the second service to receive the initial communication from the first service.

In some implementations, a computing system for managing firewall rules between different services includes at least one processor; and memory storing instructions that, when executed by the at least one processor, causes the system to perform a set of operations. In certain embodiments, the set of operations includes receiving a discovery graph comprising a plurality of services and at least one application programming interface (API) dependency, wherein the plurality of services comprises a first service and a second service. In some embodiments, the set of operations also includes determining whether the second service is permitted to receive an initial communication from the first service based upon the at least one API dependency included in the discovery graph. And, in response to determining the second service is permitted to receive the initial communication from the first service, the set of operations includes establishing a first rule for a firewall between the first service and the second service, the first rule allowing the second service to receive the initial communication from the first service.

Depending upon the embodiment, one or more benefits may be achieved. These benefits and various additional benefits can be fully appreciated with reference to the detailed description and accompanying drawings that follow.

DETAILED DESCRIPTION

In at least some examples, benefits of the embodiments include significant improvements, including for example, increased security for services running in a virtual private cloud environment.

In certain embodiments, one or more solutions rooted in computer technology overcome one or more problems specifically arising in the realm of computer technology. For example, some embodiments are directed to accessing application programming interface (API) dependencies between one or more computing services instantiated on one or more virtual private cloud (VPC) environments. In certain embodiments, the API dependencies can be stored on a discovery graph. Further, in at least some embodiments, a discovery-graph processor can map the API dependencies to firewall rules, which, according to some embodiments, allow one-directional traffic between the computing service discovering the API (e.g., the client) and the computing service producing the API (e.g., the server). In certain instances, a private-link controller initiates a virtual private connection between the computing service discovering the API and the computing service producing the API when the computing service discovering the API and the computing service producing the API are located on difference VPC environments so that the communication therebetween does not have to be routed through the open internet. In some examples, the discovery graph, discovery-graph processor, and/or the private-link controller run on a computing platform and are associated with particular resources that include CPU, memory, storage, and/or networking capacity.

Figure 1:
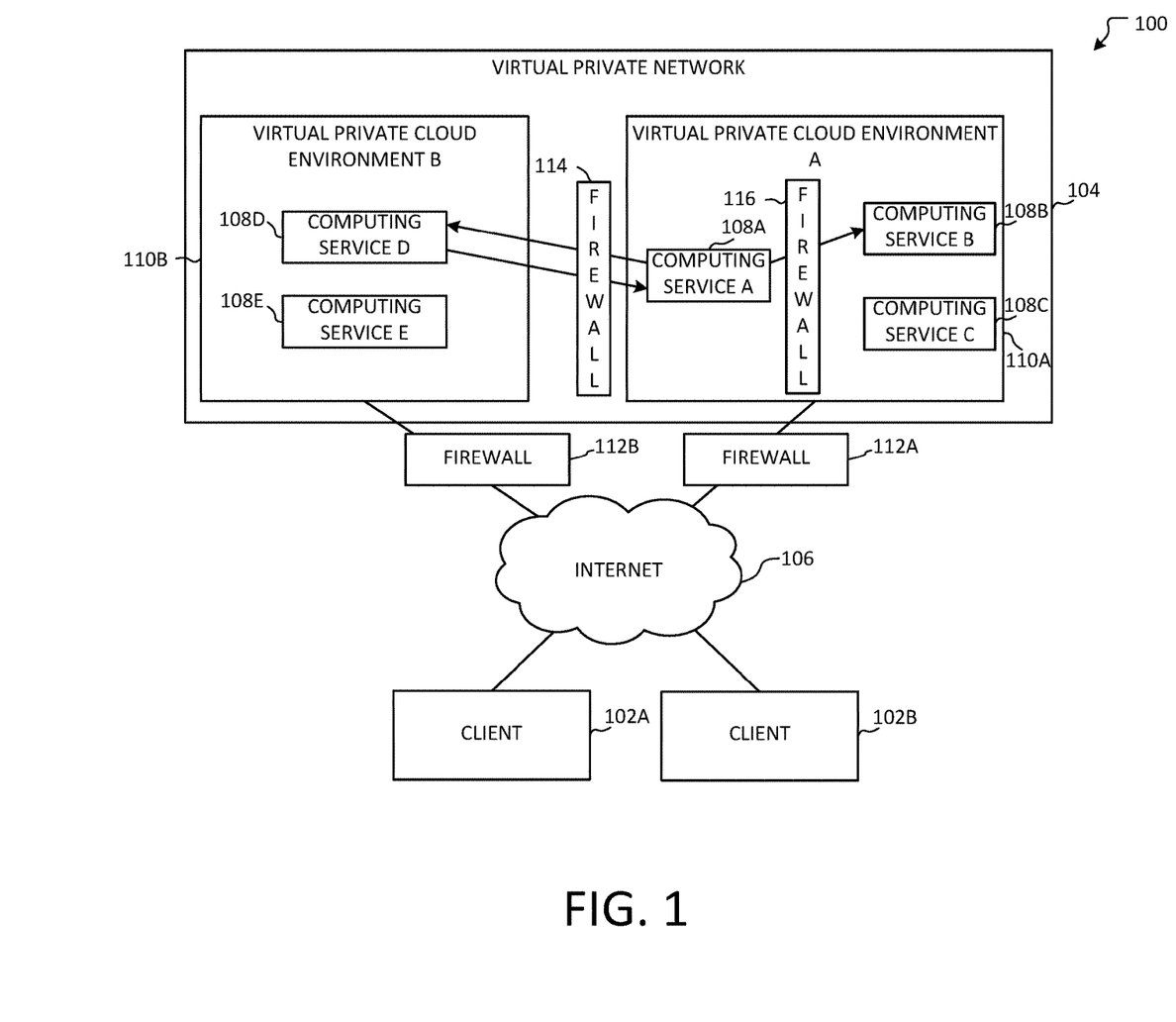
FIG. 1 is a block diagram illustrating a system for managing firewall rules and connections between different services located in a virtual private network in accordance with one example set forth in the disclosure.

FIG. 1 illustrates a system 100 that includes one or more client devices 102A, 102B that communicate with a virtual private network 104 through the internet 106. This diagram is merely an example, which should not unduly limit the scope of the claims. One of ordinary skill in the art would recognize many variations, alternatives, and modifications.

In certain embodiments, the one or more client devices 102A, 102B present a browser-based user interface or an application-based user interface, the contents of which are provided on one or more computing services (e.g., one or more computing services 108A-108E instantiated on the virtual private network 104). In certain embodiments, the one or more computing services 108 are programmed to be perform one or more computing services requested by the one or more client devices 102. In some examples, the one or more client devices 102 are one or more of laptop computers, tablets, hardware servers, desktops or any suitable devices. While two client devices 102 are illustrated, the system 100 can include more or fewer client devices 102.

According to certain embodiments, the one or more computing services 108 are instantiated on one or more VPC environments 110A, 110B on the virtual private network 104. In at least some embodiments, each VPC environment 110 includes its own private internet protocol (IP) address space and domain name system (DNS) entries. While two VPC environments 110 are illustrated, the system 100 can include more or fewer VPC environments 110.

In certain embodiments, the one or more computing services 108 and/or the one or more VPC environments 110 can be hosted on one or more servers or host machines in a data computing platform.

In at least some embodiments, due to being private, the one or more VPC environments 110 and the computing services 108 instantiated thereon are isolated from the open internet 106 by one or more firewalls 112A, 112B so that only authorized communication, as determined by one or more rules of the one or more firewalls 112, occurs between the one or more VPC environments 110 (and the one or more computing services 108 instantiated thereon) and the open internet 106. According to certain embodiments, each of the firewalls 112 has different rules for each VPC environment 110 and/or the one or more computing services 108 instantiated thereon based on what type of services and/or information the one or more clients 102 are requesting from the one or more computing services 108. Additionally, or alternatively, in certain embodiments, each of the firewalls 112 can have different rules for each VPC environment 110 and/or the one or more computing services 108 instantiated thereon based on which client device 102 is requesting the service and/or information from the one or more the one or more computing services 108.

According to certain embodiments, the virtual private network 104 includes one or more firewalls 114 that control the traffic between the one or more VPC environments 110 so that only authorized communication, as determined by one or more rules of the one or more firewalls 114, occurs between the one or more VPC environments 110 (and the one or more computing services 108 instantiated thereon). According to certain embodiments, the one or more firewalls 114 have different rules for each VPC environment 110 and/or the one or more computing services 108 instantiated thereon based on what type of services and/or information the one or more computing services 108 are requesting from the other one or more computing services 108.

According to certain embodiments, each of the one or more VPC environments 110 can include one or more firewalls 116 that control traffic between one or more computing services 108 instantiated on a single VPC environment 110 so that only authorized communication, as determined by one or more rules of the one or more firewalls 116, occurs between each of the one or more computing services 108 instantiated on the single VPC environment 110. According to certain embodiments, the one or more firewalls 116 have different rules for each of the one or more computing services 108 based on what type of services and/or information the one or more computing services 108 are requesting from the other one or more computing services 108.

In certain instances, the API dependencies of one or more of the computing services 108 are used to determine the rules of the firewalls 114, 116. For example, in at least some embodiments, one or more of the computing services 108 includes an API dependency on one or more other computing services 108. In some embodiments, the API dependencies include information to make remote network calls, such as a URL of a computing service 108. In certain instances, one or more computing services 108 include one or more API dependencies on another computing service 108 located in the same VPC environment 110 and/or include one or more API dependencies on another computing service 108 located in a different VPC environment 110.

Figure 2:
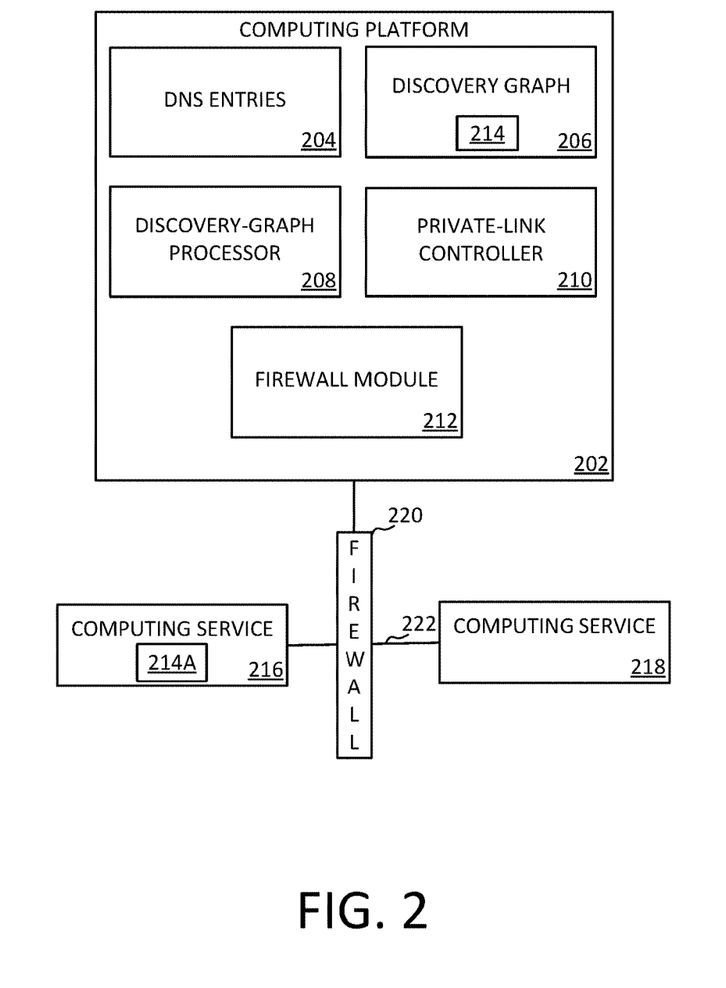
FIG. 2 is a block diagram illustrating a computing platform for managing firewall rules and connections between different services in accordance with one example set forth in the disclosure.

According to certain embodiments, the API dependencies are included in a discovery graph (e.g., the discovery graph 206 of FIG. 2). In certain instances, a discovery graph includes the API dependencies of one or more computing services 108 on one or more other computing services 108 located within one or more of the VPC environments 110.

In at least some embodiments, a discovery-graph processor (e.g., the discovery-graph processor 208 of FIG. 2) assigns rules to a firewall 114, 116 based on the API dependencies of a computing service 108. As an example, computing service A 108A depends on the API of computing service B 108B, as shown by the arrow from computing service A 108A to computing service B 180B. In this example, both computing service A 108A and computing service B 108B are located within the same VPC environment A 110A. In certain embodiments, computing service A 108A depending on the API of computing service B 108B may be referred to herein as computing service A 108A is discovering the API of computing service B 108B and computing service B 108B is producing the API. Further, in this example, computing service A 108A does not depend on the API of computing service C 108C, as shown by the lack of arrows between the two computing services 108A, 108C. Additionally, as illustrated in this example, computing service A 108A depends on computing service D 108D, but not does not depend on computing service E 108E, wherein computing service D 108D and computing service E 108E are located in a different VPC environment 110B than computing service A 108A. Further, in the illustrated example, computing service D 108D also depends on computing service A 108A, indicated by the arrow from computing service D 108D to computing service A 108A. As set forth above, these API dependencies of computing service A 108A and computing service D 108D are encompassed in a discovery graph (e.g., the discovery graph 206 of FIG. 2), in at least some embodiments.

Based on these dependencies included in a discovery graph, in at least some examples, a discovery-graph processor (e.g., the discovery-graph processor 208 of FIG. 2), configures the rules for the firewall 116 such that the firewall 116 includes a rule that allows one-way communication from computing service A 108A to computing service B 108B. Further, in at least some examples, the discovery-graph processor configures the rules for the firewall 116 such that the firewall 116 includes a rule that restricts communication from computing service B 108B to computing service A 108A based on the lack of API dependency of computing service B 108B on computing service A 108A. Additionally, in certain embodiments, the firewall 116 restricts any other communication between any of the services 108A-108C included in VPC environment A 110A based on the lack of API dependencies included in the discovery graph.

Further, based on these dependencies included in a discovery graph, a discovery-graph processor (e.g., the discovery-graph processor 208 of FIG. 2), configures the rules for the firewall 114 such that the firewall 114 includes a rule that allows communication from computing service A 108A to computing service D 108D, which is located in a different VPC environment B 108B than computing service A 108A (i.e., the computing service A 108A is located in VPC environment A 108A). Moreover, in certain embodiments, a discovery-graph processor configures the rules for the firewalls 114 such that the firewall 114 allows communication from computing service D 108D to computing service A 108A, due to the API dependency of computing service D 108D on computing service A 108A included in a discovery graph. In certain embodiments, the firewall 114 restricts any other communication between any of the services 108A-108C included in VPC environment A 110A and any of the services 108D, 108E located in VPC environment B 110B.

As stated above, in at least some embodiments, all other communication between computing services 108 that is not included in a discovery graph is prohibited by the rules of the firewalls 114, 116. As such, in certain embodiments, a minimal amount of access is allowed in this configuration. Further, in certain embodiments, due to the automation of a discovery-graph processor configuring the rules of the firewalls 114, 116 based on a discovery graph, firewalls no longer need to be manually maintained, which could easily become out of date if they are manually maintained and an API dependency changes or if a service introduces a new API dependency. As such, in at least some examples, the embodiments disclosed herein provide improvements over conventional techniques that are rooted in computer technology by including embodiments that result in a more secure virtual private network 104, more secure VPC environments 110, and/or more secure computing services 108.

In certain embodiments, a private-link controller (e.g., the private link controller 210 illustrated in FIG. 2) is configured to establish a scoped connection (also referred to herein as a virtual private connection) between two computing services 108 located in different VPC environments 110 that are allowed to communicate with one another, as determined by the rules of the firewall 114 and are based on the API dependencies included in a discovery graph. According to certain embodiments, the virtual private connection can use underlying cloud provider technology, such as Amazon Web Services (AWS) PrivateLink. However, in certain embodiments, the virtual private connection is configured to automatically be built, updated, and/or destroyed based on changes to API dependencies of computing services 108 located in different VPC environments 110. In comparison, a conventional private link is manually configured and maintained. As such, in at least some examples, the embodiments disclosed herein provide improvements over conventional techniques that are rooted in computer technology by including embodiments that result in a more up-to-date virtual private connections between computing services 108.

As an example, due to the dependency of computing service A 108A located in VPC environment A 110A and computing service D 108D located in VPC environment B 110B, a private-link controller establishes a virtual private connection between VPC environment A 110A and VPC environment B 110B. In certain embodiments, the rules of the firewall 114 are applied to the virtual private connection so that, in this example, only the computing service A 108A discovering the API can send network traffic via the virtual private connection and only the computing service D 108D can receive the network traffic from the computing service A 108A. In at least some embodiments, DNS entries for the URL produced by the computing service D 108D can be added to the VPC environment 108A hosting the computing service A 108A that point at the virtual private connection. Comparatively, according to certain conventional embodiments, the URL produced by the computing service D 108D is only resolvable within the VPC environment 108B using the DNS entries of the VPC environment 108B. Here, however, in at least some embodiments, for any computing service 108A-108E with an API accessible via a URL, any computing service 108 trying to access the API of another computing service 108 can use the same URL, even when the computing service 108 is located in another VPC environment 110. As such, in certain embodiments, computing services 108 have minimally-scoped network connections both within the VPC environments 110 and across different VPC environments 110.

According to certain embodiments, the embodiments described herein are useful in hybrid environments, where some computing services 108 run in one VPC environment 110 and other computing services 108 run in another VPC environment 110, e.g., due to resource constraints, design patterns, or some other limited factor. Furthermore, the embodiments described herein are useful when migrating from one VPC environment 110 to another VPC environment 110, as applications can be seamlessly moved from one VPC environment 110 to another VPC environment 110 without needing specific networking configuration as a part of the migration.

FIG. 2 is a block diagram illustrating at least one computing platform 202 for managing firewall rules and connections between different services 108 in accordance with one example set forth in the disclosure. According to certain embodiments, one or more of the functions described above in relation to FIG. 1 can be performed by the computing device 202. This diagram is merely an example, which should not unduly limit the scope of the claims. One of ordinary skill in the art would recognize many variations, alternatives, and modifications.

According to some embodiments, the computing platform 202 includes DNS entries 204, a discovery graph 206, a discovery-graph processor 208, a private-link module 210 and/or a firewall module 212.

In certain embodiments, the at least one computing service 202 can be included in a VPC environment (e.g., VPC environment 110) and hosted on one or more servers or host machines. In certain embodiments, the one or more servers or host machines are divided into in one or more regions. For example, a region represents a geographic area that the one or more servers or host machines are located within. As an example, each region relates to a different geographic area. In other examples, each region of the one or more servers or host machines includes one or more separate zones. For example, each server or host machine within a region is associated with only one zone of the one or more separate zones associated with the region. As an example, each zone within a region is isolated from any other zone within the region. In one example, each zone within a region is connected with any other zone within the region through low-latency links. In some examples, the computing platform 202 is configured to not replicate applications and/or resources across different regions. For example, each region is completely independent from any other region of the computing platform 202.

According to certain embodiments, the discovery graph 206 includes the API dependencies 214 of a computing service 216 and/or computing service 218. In certain embodiments, the discovery graph 206 includes all API dependencies 214 of any computing services (e.g., computing service 216 and/or computing service 218) that are included in one or more VPC environments (e.g., VPC environment 110A and/or VPC environment 110B).

In the illustrated example, the computing service 216 includes the API dependency 214A. In some examples, the computing service 216 and its API dependency 214A are the same or similar as the computing services 108 and associated API dependencies discussed above in relation to FIG. 1. For example, the computing service 216 can be programmed to be perform one or more computing services requested by the one or more client devices (e.g., the one or more client devices 102 illustrated in FIG. 1). Furthermore, as an example, the computing service 216 can be instantiated on a VPC environment (e.g., VPC environment 110A and/or VPC environment 110B on the virtual private network 104). Additionally, or alternatively, in certain examples, the API dependencies include information to make remote network calls, such as a URL of a computing service 218.

According to certain embodiments, the API dependencies 214 included in the discovery graph 206 are used by discovery-graph processor 208 to determine rules for the one or more firewalls 220. In certain embodiments, the firewall 220 has the same or similar characteristics as the firewall 114 and/or the firewall 116. In the illustrated embodiment, the API dependency 214A of computing service 216 is an API dependency 214A of computing service 216 on computing service 218. That is, for example, the computing service 216 is the computing service discovering the API and the computing service 218 is the computing service producing the API. In this example, the discovery-graph processor 208 instructs the firewall module 212 to set the rules of a firewall 220 so that only one-directional traffic is allowed between the computing service 216 and the computing service 218 due to computing service 216 having an API dependency 214A on computing service 218 and the lack of API dependency of computing service 218 on computing service 218. If, however, in some examples, the computing service 218 had an API dependency on computing service 216 and the computing service 216 had an API dependency on computing service 218, then the discovery-graph processor 208 would set the rules of the firewall 220 so that bi-directional traffic would be allowed between the computing service 216 and the computing service 218.

As set forth above, due to these embodiments, a minimal amount of access is allowed in this configuration. Further, in certain embodiments, due to the automation of a discovery-graph processor 208 configuring the rules of the firewall 220 based on the discovery graph 206, the firewall 220 no longer needs to be manually maintained, which could easily become out of date if it is manually maintained and an API dependency 214 changes or if a service introduces a new API dependency 214. As such, in at least some examples, the embodiments disclosed herein provide improvements over conventional techniques that are rooted in computer technology by including embodiments that result in a more secure computing services 216, 218 and/or communications therebetween.

As set forth above, in certain embodiments, the computing service 216 and the computing service 218 can be located in different VPC environments (e.g., VPC environment 110A and/or VPC environment 110B). In certain examples of these embodiments, the private-link controller 210 of the computing platform 202 establishes a virtual private connection 222 between the computing service 216 and the computing service 218 due to the API dependency 214A of computing service 216 on computing service 218. As set forth above, in certain examples, the virtual private connection 222 is configured to automatically be built, updated, and/or destroyed based on changes to API dependencies 214 of computing services 216, 218, which are included in the discovery graph 206. Further, in some embodiments, the rules of the firewall 220 applied by the discovery-graph processor 208 to the virtual private connection 222 only allow the computing service 216 to send network traffic via the virtual private connection 222 and only allow the computing service 218 to receive the network traffic from the computing service 216 due to the API dependency 214A of computing service 216 on computing service 218, but not vice-versa. In at least some embodiments, DNS entries for the URL produced by the computing service 218 can be added to the DNS entries 204 of the computing platform 202 that point at the virtual private connection 222.

As set forth above, the embodiments disclosed herein provide improvements over conventional techniques that are rooted in computer technology by including embodiments that result in a more up-to-date virtual private connections between computing services 108.

Figure 3A:
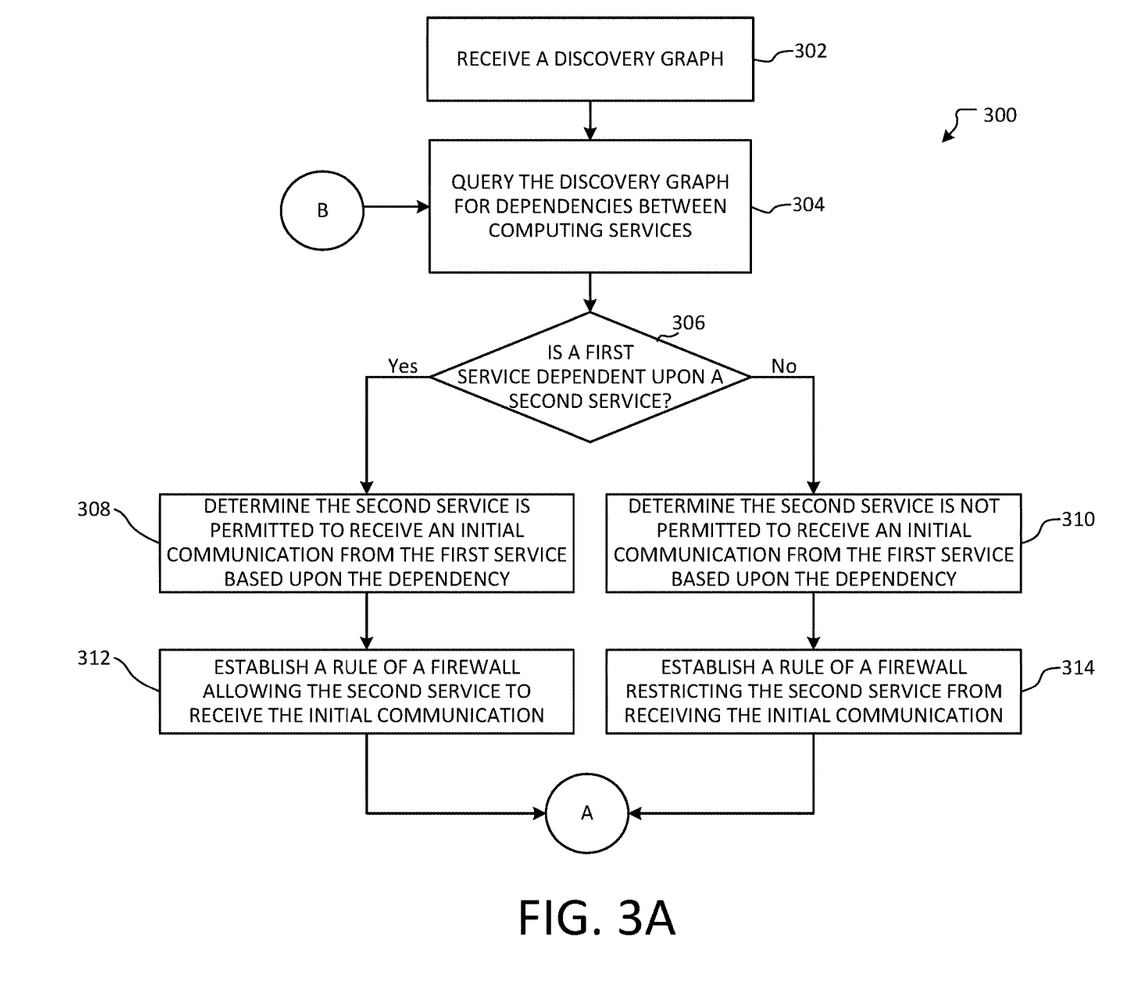
FIGS. 3A-3B are flowcharts illustrating a method for managing firewall rules and connections between different services located in a virtual private network in accordance with one example set forth in the disclosure.
Figure 3B:
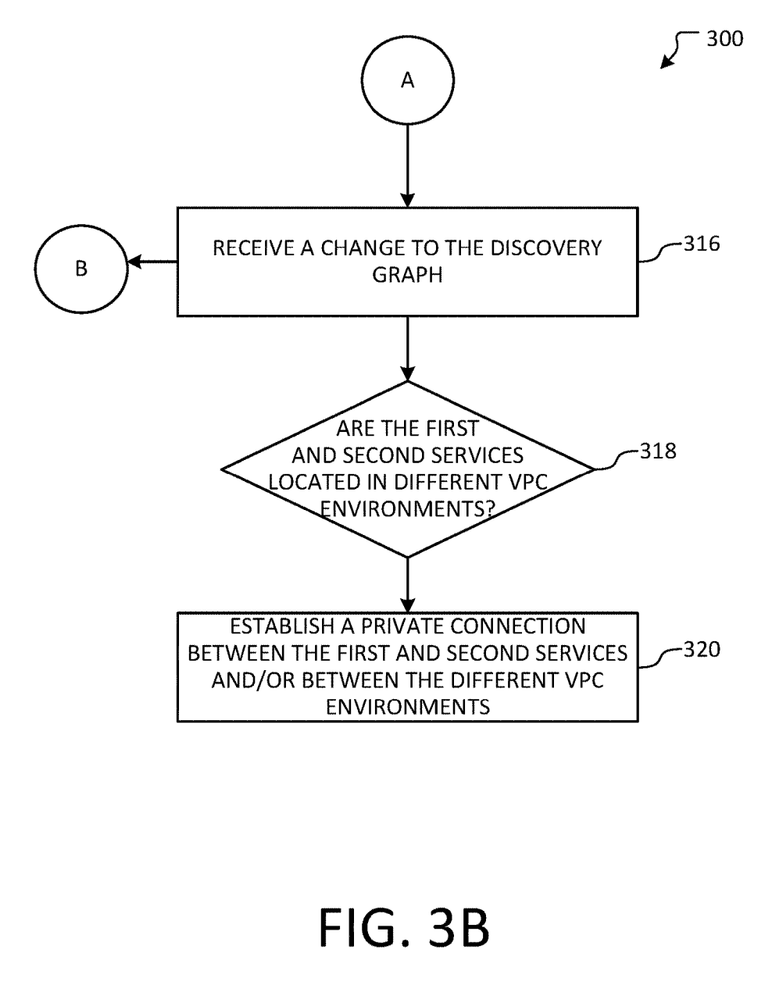

FIGS. 3A-3B are flowcharts illustrating a method 300 for managing firewall rules and connections between different services located in a virtual private network in accordance with one example set forth in the disclosure. This diagram is merely an example, which should not unduly limit the scope of the claims. One of ordinary skill in the art would recognize many variations, alternatives, and modifications. The method 300 although being shown using a selected group of processes, there can be many alternatives, modifications and variations. For example, some of the processes may be expanded and/or combined. Other processes may be inserted to those noted above. Depending upon the embodiment, the sequence of processes may be interchanged with others replaced, or the sequence altered.

In some embodiments, some or all processes (e.g., steps) of the method 300 are performed by the computing platform 202. In certain examples, some or all processes (e.g., steps) of the method 300 are performed by a computer and/or a processor directed by a code. For example, a computer includes a server computer and/or a client computer (e.g., a personal computer). In some examples, some or all processes (e.g., steps) of the method 300 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some examples, the method 300 includes receiving a discovery graph (block 302). According to certain embodiments, the discovery graph is the same or similar as the discovery graph 206. For example, the discovery graph includes API dependencies of computing services on other computing services located within one or more VPC environments.

In some instances, the method 300 includes querying the discovery graph for dependencies between computing services (block 304). According to certain embodiments, the method 300 determines whether there a first computing service is dependent upon a second computing service based on the query (block 306). Stated another way, does the first computing service include an API dependency on a second computing service. In instances where the first computing service includes an API dependency on a second computing service, the method 300 determines the second computing service is permitted to receive an initial communication from the first computing service (block 308). On the other hand, in instances where the first computing service does not include an API dependency on a second computing service, the method 300 determines the second computing service is not permitted to receive an initial communication from the first computing service (block 310).

Referring back to block 308, according to certain embodiments, the method 300 includes establishing a rule of a firewall allowing the second computing service to receive the initial communication from the first computing service when the method 300 determines the second computing service is permitted to receive an initial communication from the first computing service (block 312). In certain embodiments, a discovery-graph processor establishes the rule of the firewall allowing the second computing service to receive the initial communication. In some examples, the discovery-graph processor is the same as or similar to the discovery-graph processor 208 of FIG. 2. Additionally, or alternatively, in some examples, the firewall is the same as or similar to the firewall 114, the firewall 116, and/or the firewall 220 discussed above in relation to FIGS. 1 and 2.

Referring back to block 310, in certain embodiments, the method 300 includes establishing a rule of a firewall restricting the second computing service to receive the initial communication from the first computing service, according to certain embodiments when the method 300 determines the second computing service is not permitted to receive an initial communication from the first computing service (block 314). In certain examples, a discovery-graph processor establishes the rule of the firewall restricting the second computing service to receive the initial communication.

In at least some of these embodiments, the method 300 receives a change to the discovery graph (block 316, illustrated in FIG. 3B). As an example, an API dependency of a computing service is modified so the discovery graph changes. In some of these embodiments, the method 300 proceeds back to block 304 and the firewall rules and/or the virtual private connection are updated based on the modified discovery graph via method 300.

In certain embodiments, the method 300 determines whether the first computing service and the second computing service are located in different VPC environments (block 318). In instances where the first and second computing services are located in different VPC environments, the method 300 establishes a virtual private connection between the first computing service and the second computing service (block 320). In some instances, the virtual private connection is established by a private-link controller. In some examples, the private-link controller is the same as or similar to the private-link controller 210 discussed above in relation to FIG. 2.

Figure 4:
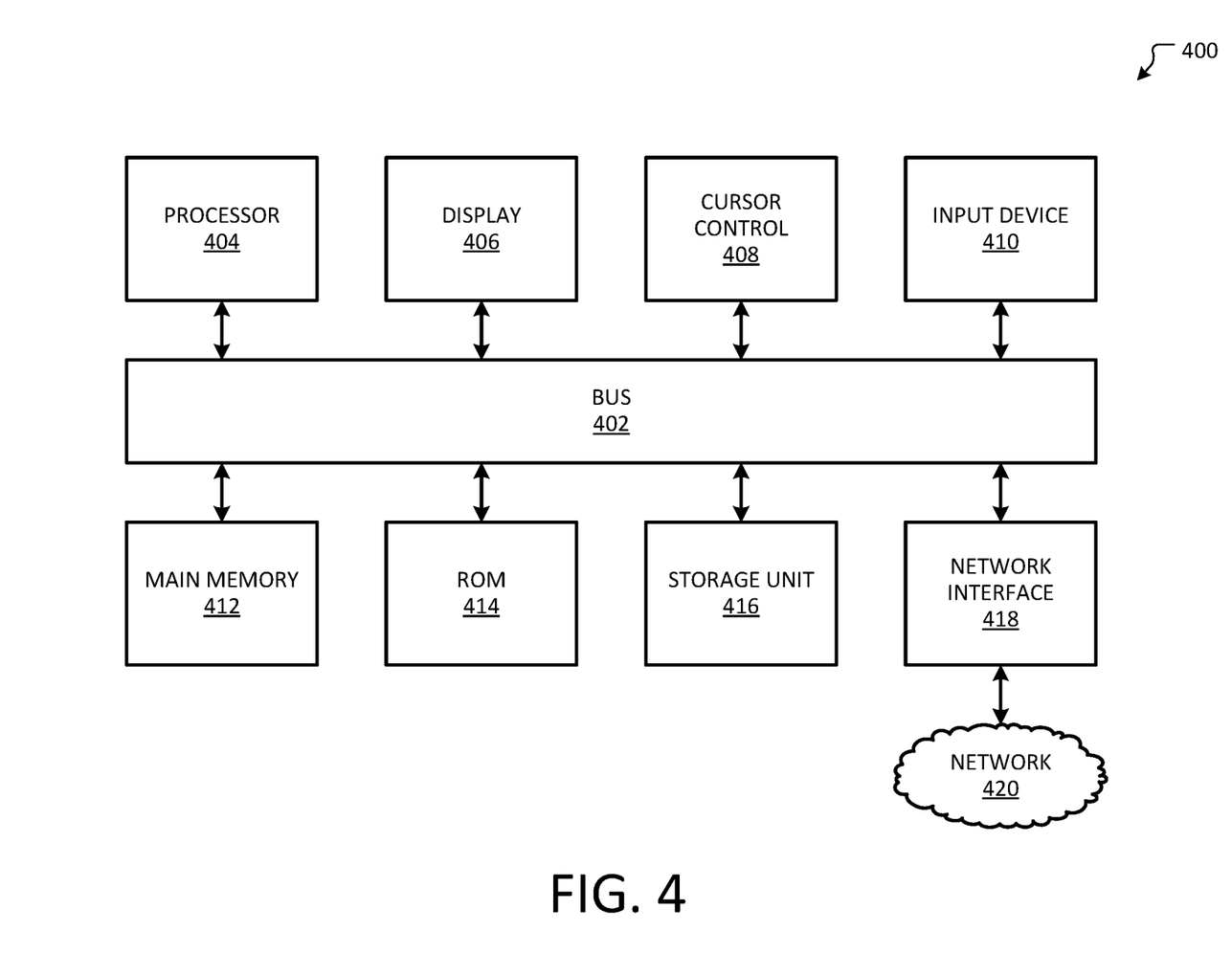
FIG. 4 is a simplified diagram showing a computing system for implementing a system for managing firewall rules and connections between different services in accordance with one example set forth in the disclosure.

FIG. 4 is a simplified diagram showing a computing system for managing firewall rules and connections between different services in accordance with one example set forth in the disclosure. This diagram is merely an example, which should not unduly limit the scope of the claims. One of ordinary skill in the art would recognize many variations, alternatives, and modifications.

The computing system 400 includes a bus 402 or other communication mechanism for communicating information, a processor 404, a display 406, a cursor control component 408, an input device 410, a main memory 412, a read only memory (ROM) 414, a storage unit 416, and a network interface 418. In some embodiments, some or all processes (e.g., steps) of the method 300 are performed by the computing system 400. In some examples, the bus 402 is coupled to the processor 404, the display 406, the cursor control component 407, the input device 410, the main memory 412, the read only memory (ROM) 414, the storage unit 416, and/or the network interface 418. In certain examples, the network interface is coupled to a network 420. For example, the processor 404 includes one or more general purpose microprocessors. In some examples, the main memory 412 (e.g., random access memory (RAM), cache and/or other dynamic storage devices) is configured to store information and instructions to be executed by the processor 404. In certain examples, the main memory 412 is configured to store temporary variables or other intermediate information during execution of instructions to be executed by processor 404. For examples, the instructions, when stored in the storage unit 416 accessible to processor 404, render the computing system 400 into a special-purpose machine that is customized to perform the operations specified in the instructions. In some examples, the ROM 414 is configured to store static information and instructions for the processor 404. In certain examples, the storage unit 416 (e.g., a magnetic disk, optical disk, or flash drive) is configured to store information and instructions.

In some embodiments, the display 406 (e.g., a cathode ray tube (CRT), an LCD display, or a touch screen) is configured to display information to a user of the computing system 400. In some examples, the input device 410 (e.g., alphanumeric and other keys) is configured to communicate information and commands to the processor 404. For example, the cursor control 408 (e.g., a mouse, a trackball, or cursor direction keys) is configured to communicate additional information and commands (e.g., to control cursor movements on the display 406) to the processor 404.

According to some embodiments, a method for managing firewall rules between different services includes receiving a discovery graph including a plurality of services and at least one application programming interface (API) dependency, wherein the plurality of services includes a first service and a second service; determining whether the second service is permitted to receive an initial communication from the first service based upon the at least one API dependency included in the discovery graph; and in response to determining the second service is permitted to receive the initial communication from the first service, establishing a first rule for a firewall between the first service and the second service, the first rule allowing the second service to receive the initial communication from the first service. For example, the method is implemented according to at least FIG. 1, FIG. 2, FIG. 3A, FIG. 3B, and/or FIG. 4.

In certain examples, in response to determining the second service is not permitted to receive the initial communication from the first service, the method further comprising establishing a second rule for the firewall between the first service and the second service, the second rule restricting the second service from receiving the initial communication from the first service.

In some examples, the first service and the second service are running on a virtual private cloud (VPC) environment.

In certain examples, the first service is running on a first VPC environment and the second service is running on a second VPC environment, wherein the first VPC environment and the second VPC environment are distinct VPC environments.

In some examples, the method includes establishing a virtual private connection between the first service and the second service in response to determining the second service is permitted to receive the initial communication from the first service.

In certain examples, the method includes dynamically updating the discovery graph in response to a change in the at least one API dependency.

In some examples, in response to the second service no longer being permitted to receive the initial communication from the first service based upon the change of the at least one API dependency, the method includes changing the first rule of the firewall to restrict the second service from receiving the initial communication from the first service.

In certain examples, in response to the second service being permitted to receive the initial communication from the first service based upon the change of the at least one API dependency, the method includes changing the second rule of the firewall to allow the second service from receiving the initial communication from the first service.

According to certain embodiments, a method for managing communication between services located in distinct virtual private cloud (VPC) environments includes: receiving a discovery graph comprising a plurality of services and at least one API dependency, wherein a first service of the plurality of services is running on a first VPC environment and a second service of the plurality of services is running on a second VPC environment, wherein the first VPC environment and the second VPC environment are distinct VPC environments; determining whether the second service is permitted to receive an initial communication from the first service based upon the at least one API dependency included in the discovery graph; and in response to determining the second service is permitted to receive the initial communication from the first service, establishing a virtual private connection between the first service and the second service and establishing a first rule for a firewall between the first service and the second service, the first rule allowing the second service to receive the initial communication from the first service. For example, the method is implemented according to at least FIG. 1, FIG. 2, FIG. 3A, FIG. 3B, and/or FIG. 4.

In some examples, in response to determining the second service is not permitted to receive the initial communication from the first service, the method includes establishing a second rule for the firewall between the first service and the second service, the second rule restricting the second service from receiving the initial communication from the first service.

In certain examples, the method includes dynamically updating the discovery graph in response to a change in the at least one API dependency.

In some examples, in response to the second service no longer being permitted to receive the initial communication from the first service based upon the change of the at least one API dependency, the method includes ending the virtual private connection between the first service the second service and changing the first rule of the firewall to restrict the second service from receiving the initial communication from the first service.

In certain examples, in response to the second service being permitted to receive the initial communication from the first service based upon the change of the at least one API dependency, the method includes establishing a virtual private connection between the first service and the second service and changing the second rule of the firewall to allow the second service from receiving the initial communication from the first service.

According to some embodiments, a computing system for managing firewall rules between different services includes: at least one processor; and memory storing instructions that, when executed by the at least one processor, causes the system to perform a set of operations, the set of operations including: receiving a discovery graph comprising a plurality of services and at least one application programming interface (API) dependency, wherein the plurality of services comprises a first service and a second service; determining whether the second service is permitted to receive an initial communication from the first service based upon the at least one API dependency included in the discovery graph; and in response to determining the second service is permitted to receive the initial communication from the first service, establishing a first rule for a firewall between the first service and the second service, the first rule allowing the second service to receive the initial communication from the first service. For example, the computing system is implemented according to at least FIG. 1, FIG. 2, FIG. 3A, FIG. 3B, and/or FIG. 4.

In certain examples, in response to determining the second service is not permitted to receive the initial communication from the first service, the set of operations includes establishing a second rule for the firewall between the first service and the second service, the second rule restricting the second service from receiving the initial communication from the first service in response to determining the second service is not permitted to receive the initial communication from the first service.

In some examples, the first service and the second service are running on a virtual private cloud (VPC) environment.

In certain examples, the first service is running on a first VPC environment and the second service is running on a second VPC environment, wherein the first VPC environment and the second VPC environment are distinct VPC environments.

In some examples, the set of operations includes establishing a virtual private connection between the first service and the second service in response to determining the second service is permitted to receive the initial communication from the first service.

In certain examples, the set of operations further comprising dynamically updating the discovery graph in response to a change in the at least one API dependency.

In some examples, in response to the second service no longer being permitted to receive the initial communication from the first service based upon the change of the at least one API dependency, the method includes changing the first rule of the firewall to restrict the second service from receiving the initial communication from the first service.

According to some embodiments, a system for managing communication between services located in distinct virtual private cloud (VPC) environments includes at least one processor; and memory storing instructions that, when executed by the at least one processor, causes the system to perform a set of operations, the set of operations including: receiving a discovery graph comprising a plurality of services and at least one API dependency, wherein a first service of the plurality of services is running on a first VPC environment and a second service of the plurality of services is running on a second VPC environment, wherein the first VPC environment and the second VPC environment are distinct VPC environments; determining whether the second service is permitted to receive an initial communication from the first service based upon the at least one API dependency included in the discovery graph; and in response to determining the second service is permitted to receive the initial communication from the first service, establishing a virtual private connection between the first service and the second service and establishing a first rule for a firewall between the first service and the second service, the first rule allowing the second service to receive the initial communication from the first service. In certain examples, the system is implemented according to at least FIG. 1, FIG. 2, FIG. 3A, FIG. 3B, and/or FIG. 4.

According to some embodiments, a non-transitory computer-readable storage medium storing processor executable instructions, that when executed cause one or more processors to: receive a discovery graph including a plurality of services and at least one application programming interface (API) dependency, wherein the plurality of services includes a first service and a second service; determine whether the second service is permitted to receive an initial communication from the first service based upon the at least one API dependency included in the discovery graph; and in response to determining the second service is permitted to receive the initial communication from the first service, establish a first rule for a firewall between the first service and the second service, the first rule allowing the second service to receive the initial communication from the first service. In certain examples, the non-transitory computer-readable storage medium is implemented according to at least FIG. 1, FIG. 2, FIG. 3A, FIG. 3B, and/or FIG. 4.

According to some embodiments, a non-transitory computer-readable storage medium storing processor executable instructions, that when executed cause one or more processors to: receive a discovery graph comprising a plurality of services and at least one API dependency, wherein a first service of the plurality of services is running on a first VPC environment and a second service of the plurality of services is running on a second VPC environment, wherein the first VPC environment and the second VPC environment are distinct VPC environments; determine whether the second service is permitted to receive an initial communication from the first service based upon the at least one API dependency included in the discovery graph; and in response to determining the second service is permitted to receive the initial communication from the first service, establish a virtual private connection between the first service and the second service and establish a first rule for a firewall between the first service and the second service, the first rule allowing the second service to receive the initial communication from the first service. In certain examples, the non-transitory computer-readable storage medium is implemented according to at least FIG. 1, FIG. 2, FIG. 3A, FIG. 3B, and/or FIG. 4.

What is claimed is:

1. A computer-implemented method for managing firewall rules between different services, the method comprising:
    receiving a discovery graph comprising a plurality of services and at least one application programming interface (API) dependency, wherein the plurality of services comprises a first service running on a first virtual private cloud (VPC) environment and a second service running on a second VPC environment, wherein the first VPC environment is distinct from the second VPC environment;
    determining whether the second service is permitted to receive an initial communication from the first service based upon the at least one API dependency included in the discovery graph; and
    in response to determining the second service is permitted to receive the initial communication from the first service, establishing a virtual private connection between the first VPC environment and the second VPC environment and establishing a first rule for a firewall between the first service and the second service, the first rule allowing the second service to receive the initial communication from the first service.

2. The computer-implemented method of claim 1, wherein in response to determining the second service is not permitted to receive the initial communication from the first service, the method further comprising establishing a second rule for the firewall between the first service and the second service, the second rule restricting the second service from receiving the initial communication from the first service.

3. The computer-implemented method of claim 2, further comprising dynamically updating the discovery graph in response to a change in the at least one API dependency.

4. The computer-implemented method of claim 3, wherein in response to the second service no longer being permitted to receive the initial communication from the first service based upon the change of the at least one API dependency, the method further comprising changing the first rule of the firewall to restrict the second service from receiving the initial communication from the first service.

5. The computer-implemented method of claim 3, wherein in response to the second service being permitted to receive the initial communication from the first service based upon the change of the at least one API dependency, the method further comprising changing the second rule of the firewall to allow the second service from receiving the initial communication from the first service.

6. A computer-implemented method for managing communication between services located in distinct virtual private cloud (VPC) environments, the method comprising:
    receiving a discovery graph comprising a plurality of services and at least one API dependency, wherein a first service of the plurality of services is running on a first VPC environment and a second service of the plurality of services is running on a second VPC environment, wherein the first VPC environment and the second VPC environment are distinct VPC environments,
    determining whether the second service is permitted to receive an initial communication from the first service based upon the at least one API dependency included in the discovery graph; and
    in response to determining the second service is permitted to receive the initial communication from the first service, establishing a virtual private connection between the first VPC environment and the second VPC environment and establishing a first rule for a firewall between the first service and the second service, the first rule allowing the second service to receive the initial communication from the first service.

7. The computer-implemented method of claim 6, wherein in response to determining the second service is not permitted to receive the initial communication from the first service, the method further comprising establishing a second rule for the firewall between the first service and the second service, the second rule restricting the second service from receiving the initial communication from the first service.

8. The computer-implemented method of claim 7, further comprising dynamically updating the discovery graph in response to a change in the at least one API dependency.

9. The computer-implemented method of claim 8, wherein in response to the second service no longer being permitted to receive the initial communication from the first service based upon the change of the at least one API dependency, the method further comprising ending the virtual private connection between the first VPC environment the second VPC environment and changing the first rule of the firewall to restrict the second service from receiving the initial communication from the first service.

10. The computer-implemented method of claim 8, wherein in response to the second service being permitted to receive the initial communication from the first service based upon the change of the at least one API dependency, the method further comprising and changing the second rule of the firewall to allow the second service from receiving the initial communication from the first service.

11. A computing system for managing firewall rules between different services, the computing system comprising:
    at least one processor; and
    memory storing instructions that, when executed by the at least one processor, causes the system to perform a set of operations, the set of operations comprising:
        receiving a discovery graph comprising a plurality of services and at least one application programming interface (API) dependency, wherein the plurality of services comprises a first service running on a first virtual private cloud (VPC) environment and a second service running on a second VPC environment, wherein the first VPC environment is distinct from the second VPC environment;
        determining whether the second service is permitted to receive an initial communication from the first service based upon the at least one API dependency included in the discovery graph; and
        in response to determining the second service is permitted to receive the initial communication from the first service, establishing a virtual private connection between the first VPC environment and the second VPC environment and establishing a first rule for a firewall between the first service and the second service, the first rule allowing the second service to receive the initial communication from the first service.

12. The computing system of claim 11, wherein in response to determining the second service is not permitted to receive the initial communication from the first service, the set of operations further comprising establishing a second rule for the firewall between the first service and the second service, the second rule restricting the second service from receiving the initial communication from the first service in response to determining the second service is not permitted to receive the initial communication from the first service.

13. The computing system of claim 11, the set of operations further comprising dynamically updating the discovery graph in response to a change in the at least one API dependency.

14. The computing system of claim 13, wherein in response to the second service no longer being permitted to receive the initial communication from the first service based upon the change of the at least one API dependency, the method further comprising changing the first rule of the firewall to restrict the second service from receiving the initial communication from the first service.

* * * * *